US011936094B2

(12) United States Patent
Neenan et al.

(10) Patent No.: US 11,936,094 B2
(45) Date of Patent: Mar. 19, 2024

(54) ANTENNA SYSTEM

(71) Applicant: Parsec Technologies, Inc., Plano, TX (US)

(72) Inventors: Michael A. Neenan, Plano, TX (US); Richard Loy Smith, Jr., Dallas, TX (US); George Alexander Bednekoff, Plano, TX (US)

(73) Assignee: Parsec Technologies, Inc., Plano, TX (US)

(*) Notice: Subject to any disclaimer, the term of this patent is extended or adjusted under 35 U.S.C. 154(b) by 0 days.

(21) Appl. No.: 18/301,527

(22) Filed: Apr. 17, 2023

(65) Prior Publication Data

US 2023/0402733 A1 Dec. 14, 2023

Related U.S. Application Data

(63) Continuation of application No. 17/699,578, filed on Mar. 21, 2022, now Pat. No. 11,658,382, which is a continuation of application No. 16/588,732, filed on Sep. 30, 2019, now Pat. No. 11,283,149.

(51) Int. Cl.

| | |
|---|---|
| ***H01Q 1/08*** | (2006.01) |
| ***H01Q 1/24*** | (2006.01) |
| *H01Q 1/12* | (2006.01) |
| *H01Q 5/30* | (2015.01) |
| *H01Q 9/04* | (2006.01) |
| *H01Q 9/16* | (2006.01) |
| *H01Q 11/10* | (2006.01) |

(52) U.S. Cl.

CPC ............... *H01Q 1/08* (2013.01); *H01Q 1/243* (2013.01); *H01Q 1/1235* (2013.01); *H01Q 1/125* (2013.01); *H01Q 1/24* (2013.01); *H01Q 5/30* (2015.01); *H01Q 9/0421* (2013.01); *H01Q 9/16* (2013.01); *H01Q 11/10* (2013.01)

(58) Field of Classification Search

CPC H01Q 1/08; H01Q 1/243; H01Q 5/30; H01Q 1/24; H01Q 9/0421

See application file for complete search history.

(56) References Cited

U.S. PATENT DOCUMENTS

| | | | |
|---|---|---|---|
| 11,283,149 B2 | 3/2022 | Neenan et al. | |
| 11,329,363 B1 | 5/2022 | Neenan et al. | |
| 11,664,574 B2 | 5/2023 | Neenan et al. | |
| 2014/0375507 A1 | 12/2014 | Lin et al. | |
| 2015/0102974 A1 | 4/2015 | Stoytchev et al. | |
| 2016/0277062 A1* | 9/2016 | Cheon | H04B 1/3827 |
| 2019/0237850 A1 | 8/2019 | Fleischer et al. | |
| 2019/0305406 A1 | 10/2019 | Williams | |
| 2019/0341674 A1 | 11/2019 | Rosenthal et al. | |
| 2023/0055367 A1 | 2/2023 | Neenan et al. | |

* cited by examiner

*Primary Examiner* — Joseph J Lauture

(74) *Attorney, Agent, or Firm* — Knobbe, Martens, Olson & Bear, LLP

(57) ABSTRACT

Embodiments of the present invention provides an antenna and an antenna system. The antenna includes a body member, a head member integrally connected to a first edge of the body member, wherein the head member forms a fold having a first angle towards the front face of the body member, and a first arm member and a second arm member, wherein the first arm member and the second arm member are integrally connected to the body member corresponding to the second edge and the third edge of the body member, and wherein the set of arm members each form a fold having a second angle towards the front face of the body member.

14 Claims, 9 Drawing Sheets

ANTENNA SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND OF THE INVENTION

Field of the Invention

The present application relates to the field of wireless broadband communication, and more particularly to antenna systems.

Description of the Related Art

Over the last few decades, Long Term Evolution (LTE) has become a standard in wireless data communications technology. Wireless communication relies on a variety of radio components including radio antennas that are used for transmitting and receiving information via electromagnetic waves. To communicate to specific devices without interference from other devices, radio transceivers and receivers communicate within a dedicated frequency bandwidth and have associated antennae that are configured to electromagnetically resonate at frequencies within the dedicated bandwidth. As more wireless devices are used on a frequency bandwidth, a communication bottleneck occurs as wireless devices compete for frequency channels within a dedicated bandwidth. LTE frequency bands range from 450 MHz to 6 GHz, however, antennas configured to resonate within this spectrum only resonate within a portion of the full LTE spectrum. To capture a greater portion of the LTE spectrum, either an antenna array of various antenna configurations is used, or a single geometrically complex antenna can be used. An antenna array, in most instances, take up too much space and is therefore impractical for small devices, but employing a single antenna will have a useable bandwidth that is limited by its geometrical configuration. In one example, a known antenna configuration permits a 700 MHz-2.7 GHz frequency band; however, a single antenna configuration that permits a wider frequency band is desired.

SUMMARY OF THE INVENTION

Embodiments of the present invention disclose an antenna and an antenna assembly. In one embodiment of the present invention, an antenna is provided comprising a body member having a front face, a first edge, a second edge, a third edge, and a fourth edge; a head member integrally connected to a first edge of the body member, wherein the head member forms a fold having a first angle towards the front face of the body member; and a first arm member and a second arm member, wherein the first arm member and the second arm member are integrally connected to the body member corresponding to the second edge and the third edge of the body member, and wherein the set of arm members each form a fold having a second angle towards the front face of the body member.

In another embodiment, an antenna assembly is provided comprising: the previously said antenna, a tuner a second body member having a front face, a first end, and a second end; a base member integrally connected to the first end of the second body member, wherein the base member forms a fold having a first angle towards the front face of the second body member; an arm member having a first end and a second end, wherein the arm member is integrally connected to the second end of the second body member along on the first end of the arm member, wherein the arm member forms a fold having a first angle towards the front face of the second body member; a face plate member is integrally connected to the second end of the arm member, wherein the face plate member forms a fold having a first angle away from the front face of the second body member; wherein the antenna and the tuner are positioned a first distance, wherein the front face of the antenna and the front face of the tuner oppositely face each other; and wherein the antenna is connected to an antenna connection of a radio and the tuner is connected to a tuner connection of the radio.

Ultimately the invention may take many embodiments. In these ways, the present invention overcomes the disadvantages inherent in the prior art.

The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
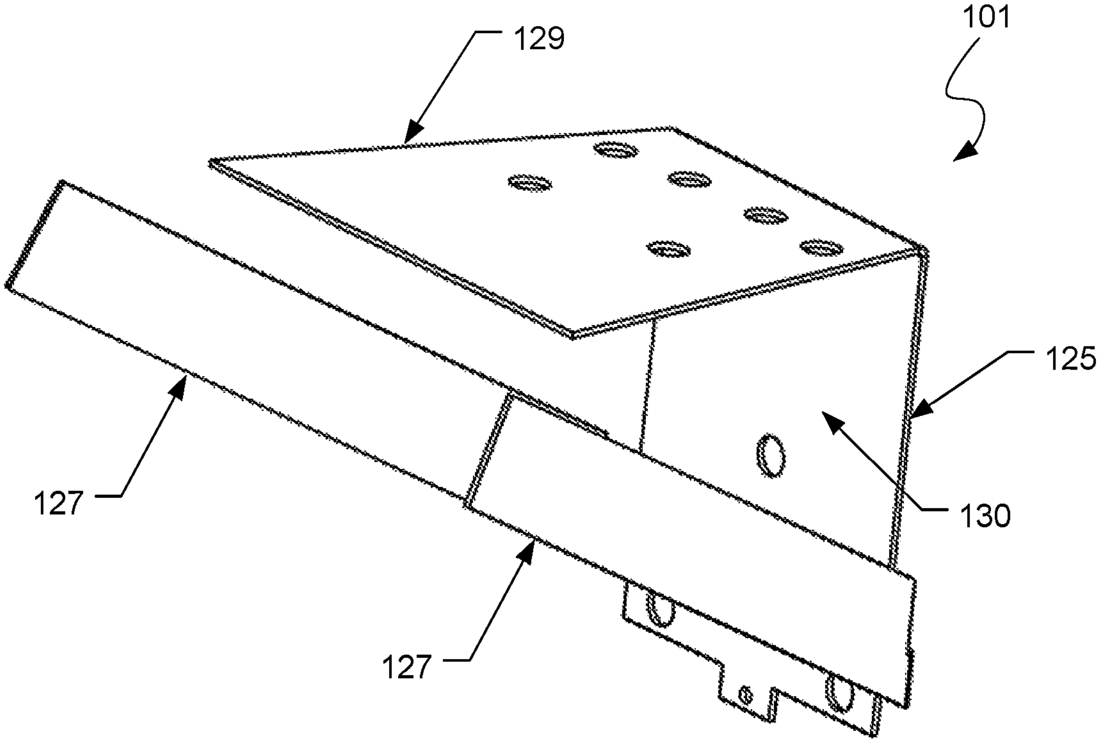
FIG. 1 is a perspective view of an antenna, in accordance with an embodiment of the present invention.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The system and method in accordance with the present invention overcomes one or more of the above-discussed problems commonly associated with traditional antenna systems. In particular, the system of the present invention is an antenna system having three bend arm members paired with a tuning element that permits a frequency range of 600 MHz to 6.0 GHz, which provides a wider range of frequencies than antenna systems currently known in the art. The three bent arm members allow for the antenna to be compact, making it ideal for compact LTE transmitters. These and other unique features of the system are discussed below and illustrated in the accompanying drawings.

The system and method will be understood, both as to its structure and operation, from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described. As used herein, "system" and "assembly" are used interchangeably. It should be noted that the articles "a", "an", and "the", as used in this specification, include plural referents unless the content clearly dictates otherwise. Dimensions provided herein provide for an exemplary embodiment, however, alternate embodiments having scaled and proportional dimensions of the presented exemplary embodiment are also considered. Additional features and functions are illustrated and discussed below.

Figure 12:
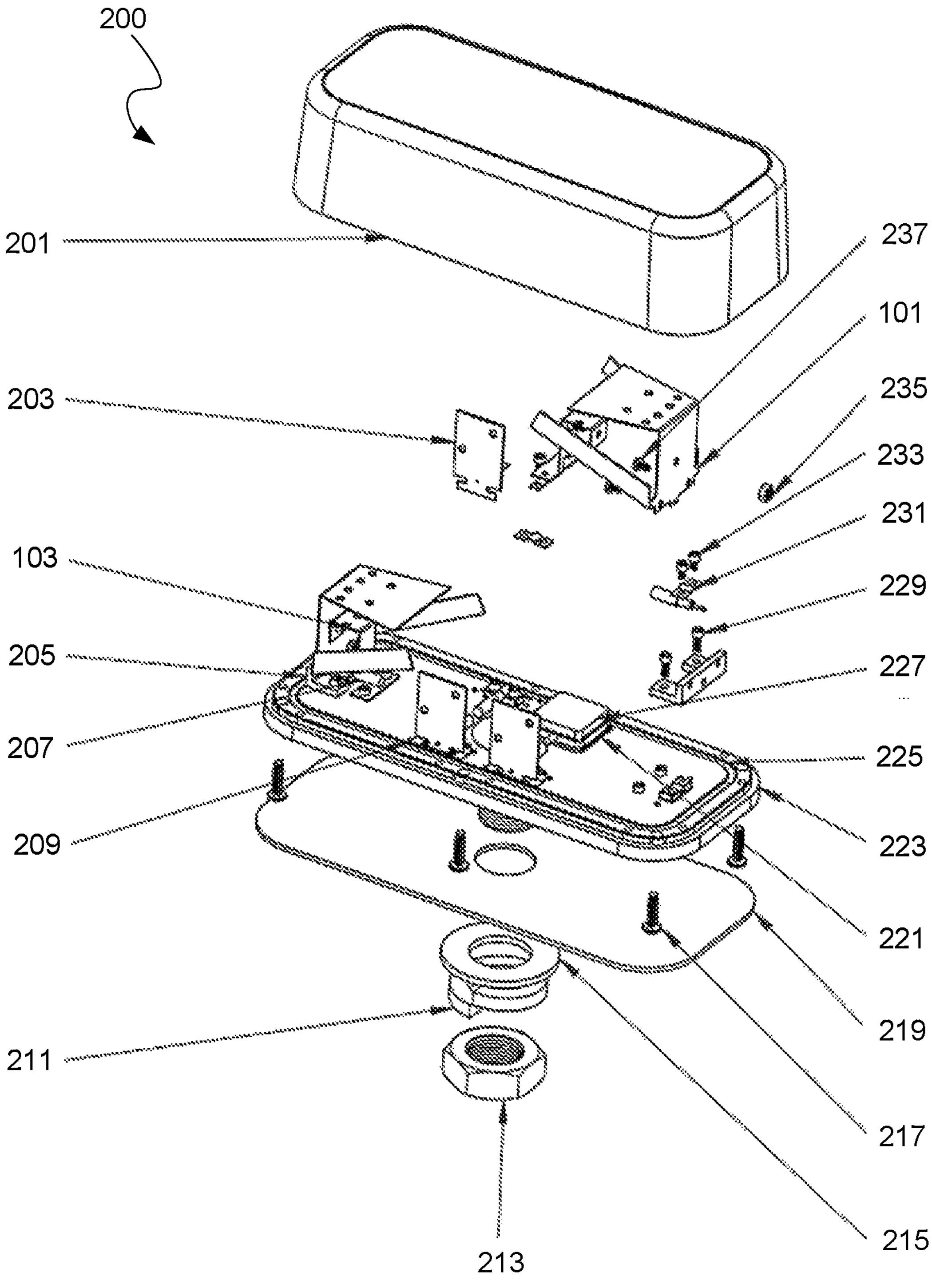
FIG. 12 is a perspective view of an antenna assembly having the antenna and the tuning element, in accordance with an embodiment of the present invention.

Referring now to the drawings wherein like reference characters identify corresponding or similar elements in form and function throughout the several views. FIGS. 1, 3-6 illustrate assorted views of an antenna. FIGS. 2, 7-11 illustrate a tuning element that is paired with the antenna. FIG. 12 illustrates an antenna and a tuning element employed with an antenna assembly.

Referring now to FIG. 1, a perspective view of antenna 101 is illustrated in accordance with an embodiment of the present invention.

In general, antenna 101 is a modified printed inverted-F antenna (PIFA) modified to have three bent arm members that make the antenna a three-dimensional antenna as opposed to a two-dimensional antenna generally practiced in the art for printed inverted F antennae. Furthermore, antenna 101 is a dual band monopole antenna that has a configuration that, when used in conjunction with high order electromagnetic modes generated or received by a transceiver and/or receiver (as is typically performed for PIFA antennae), permit the antenna to have an operating frequency range of 600 MHz to 6.0 GHz.

In FIG. 1, antenna 101 comprise of a body, a set of arms, and a head. The body of antenna 101 is shown as body 125. The set of arms of antenna 101 is shown as arms 127. The head of antenna 101 is shown as head 129. In one embodiment, the head and the set of arms of antenna 101 are integrally connected to the body. In other words, the head, the set of arms, and the body are a single piece wherein the head, the set of arms, and the body are differentiable based on a corresponding set of folds of antenna 101.

The components of antenna 101 are further depicted and illustrated with reference to FIGS. 3-6.

Figure 2:
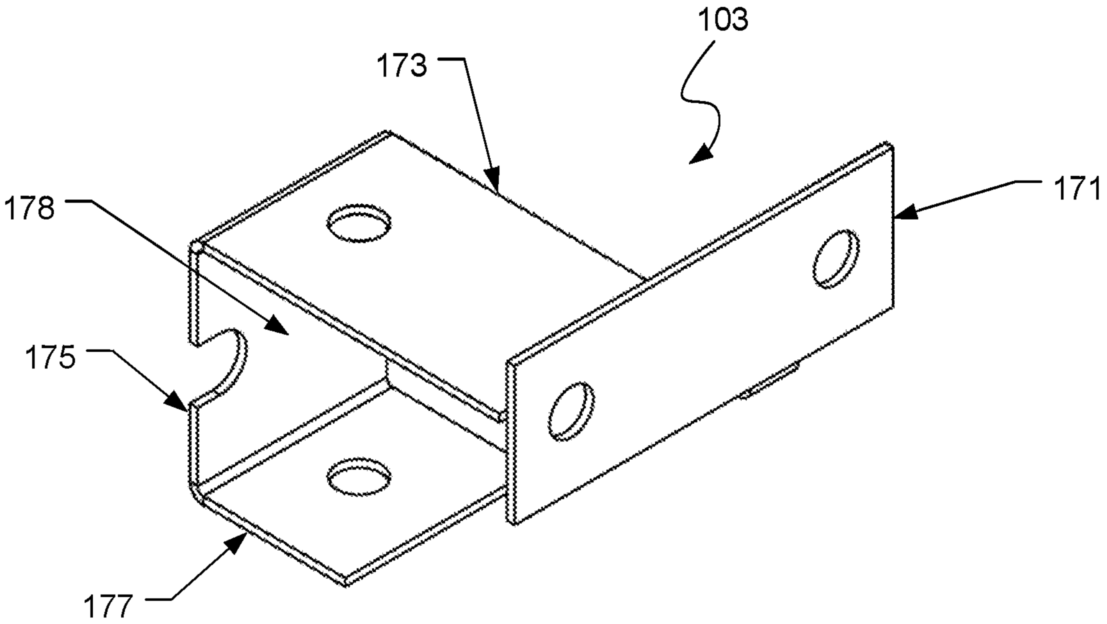
FIG. 2 is a perspective view of a tuning element, in accordance with an embodiment of the present invention.
Figure 3:
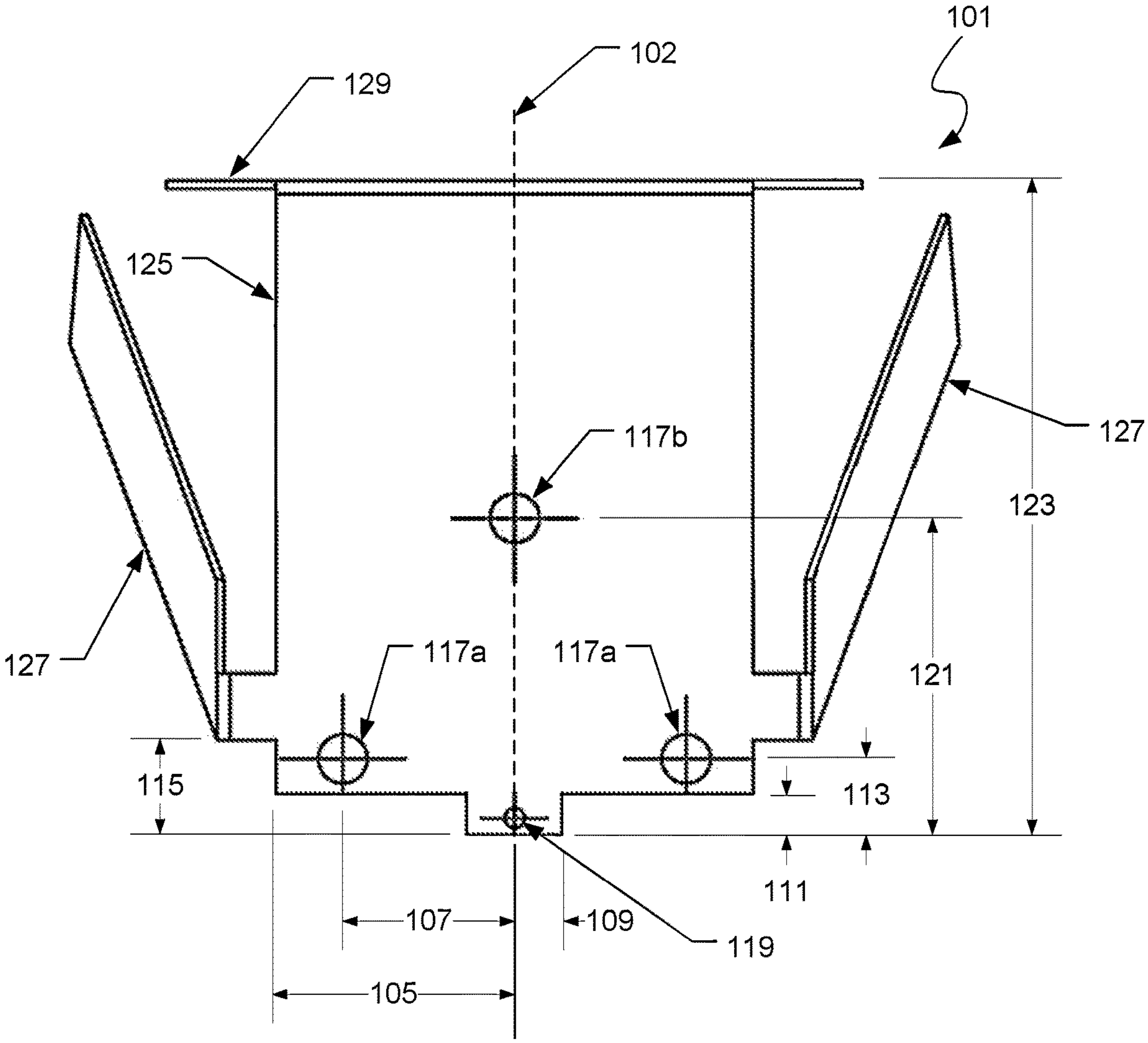
FIG. 3 is a back view of the antenna of FIG. 1.
Figure 4:
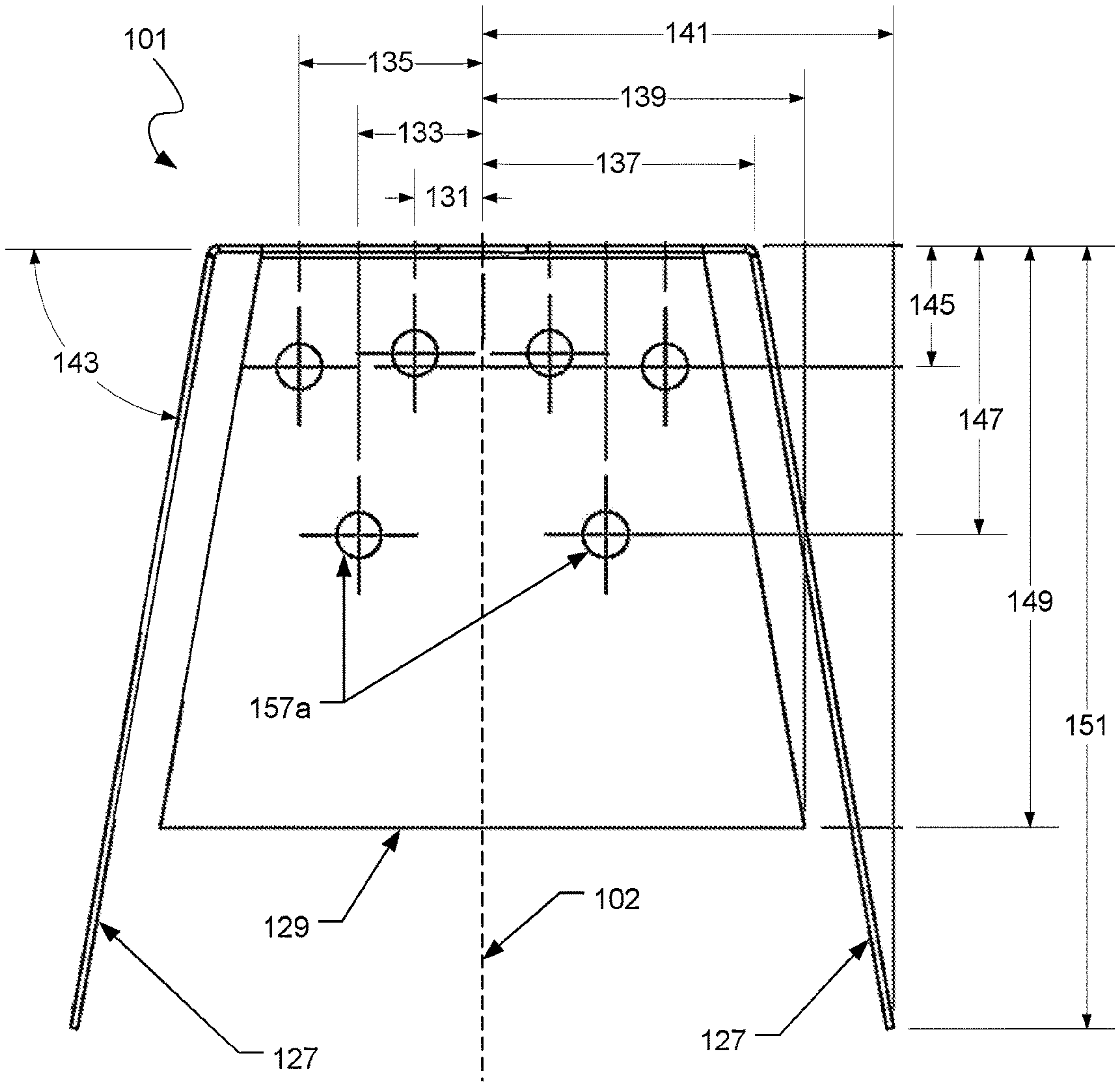
FIG. 4 is a top view of the antenna of FIG. 1.
Figure 5:
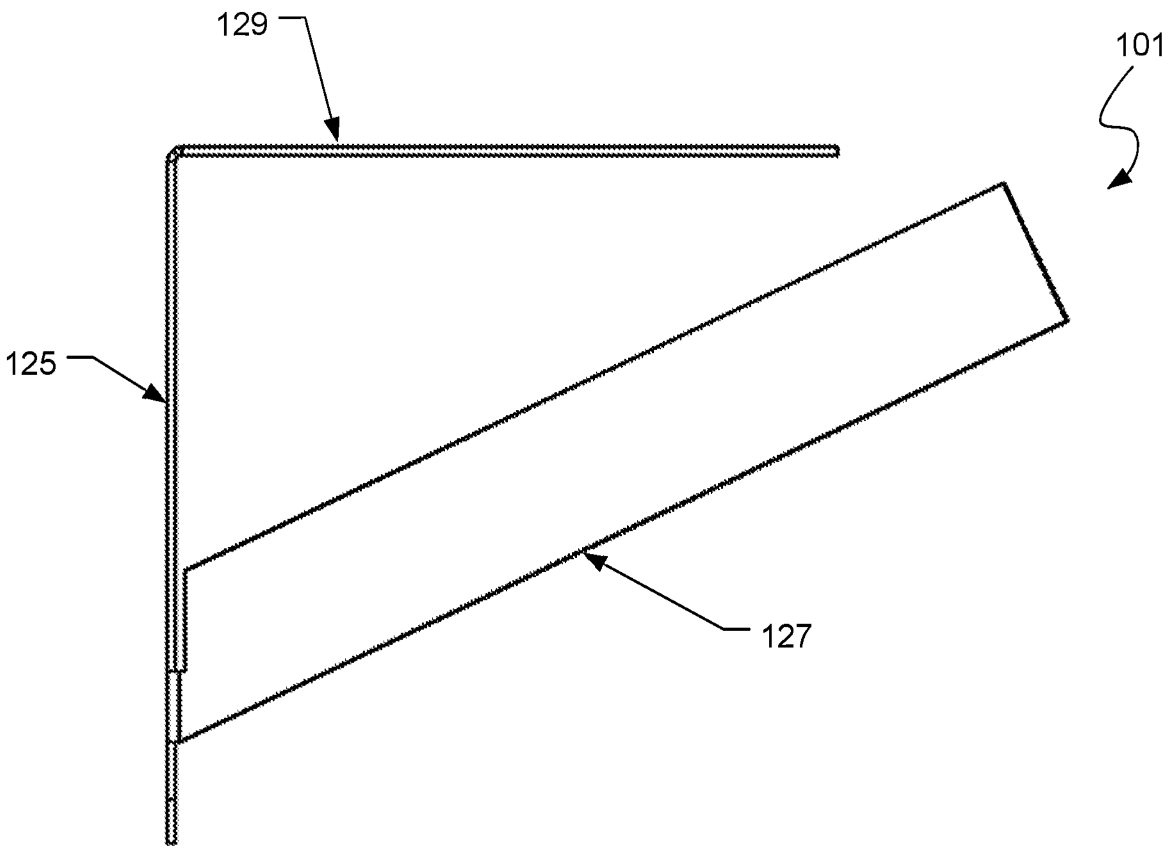
FIG. 5 is a side view of the antenna of FIG. 1.
Figure 6:
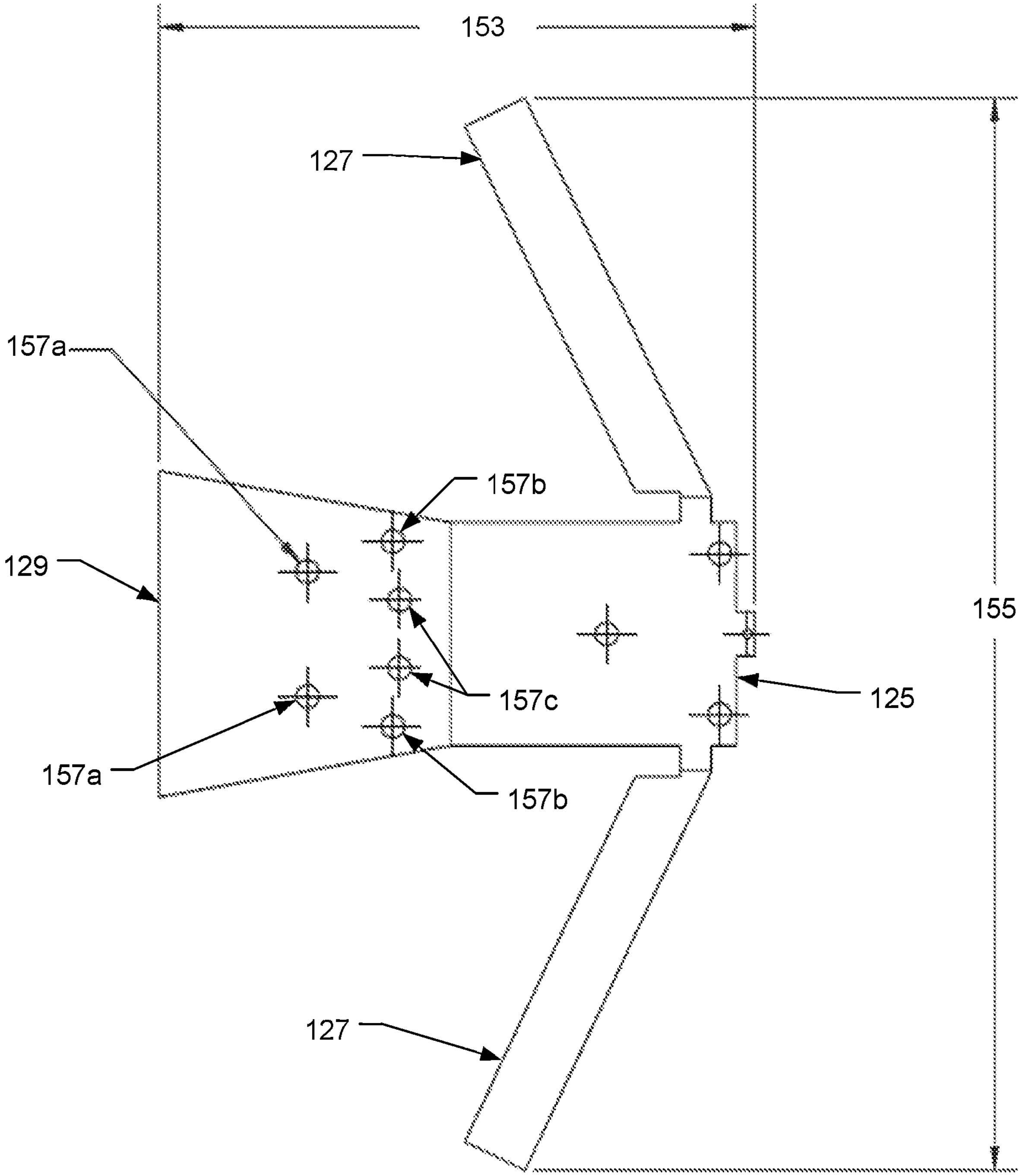
FIG. 6 is a flat pattern view of the antenna of FIG. 1.
Figure 7:
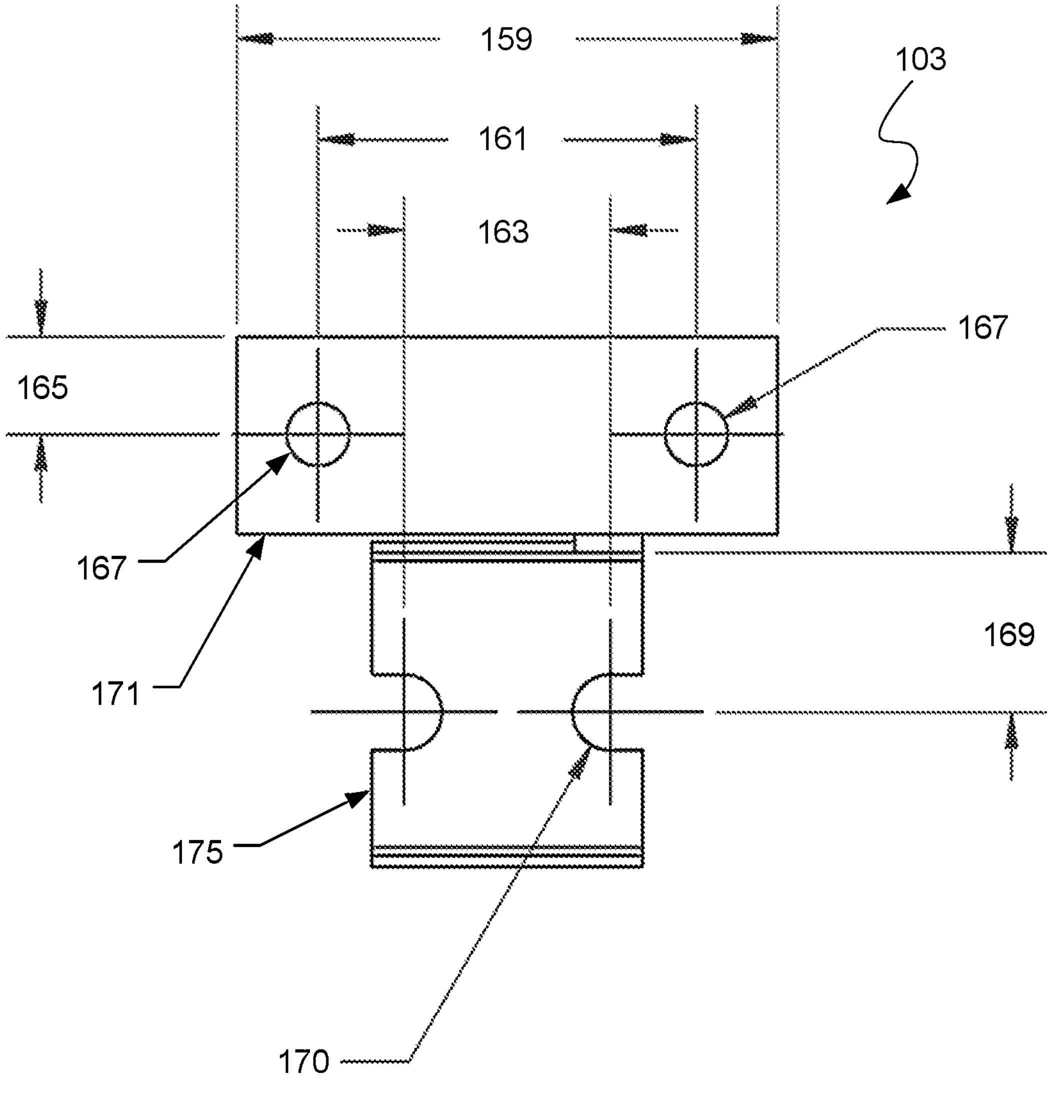
FIG. 7 is a front view of the tuning element of FIG. 2.
Figure 8:
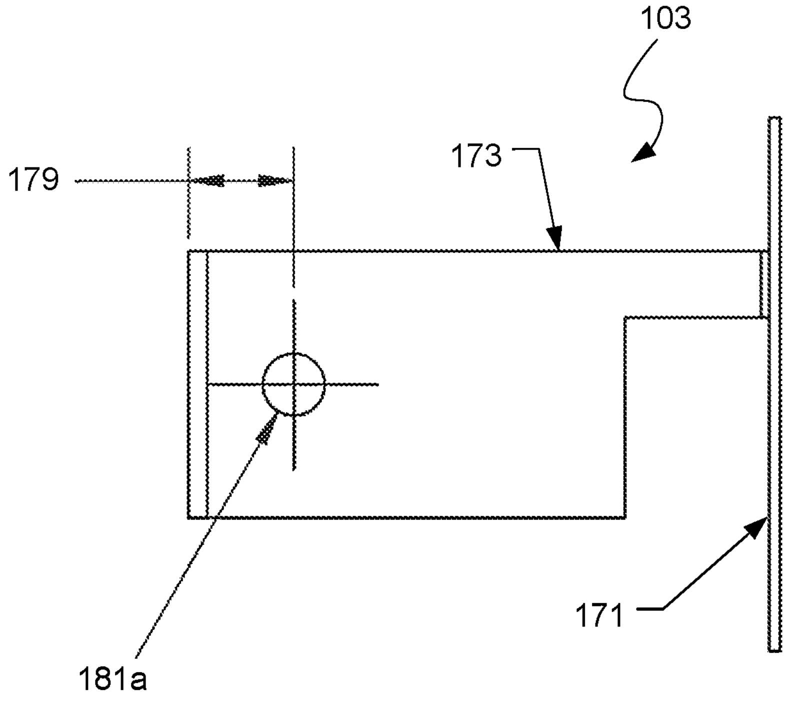
FIG. 8 is a top view of the tuning element of FIG. 2.
Figure 9:
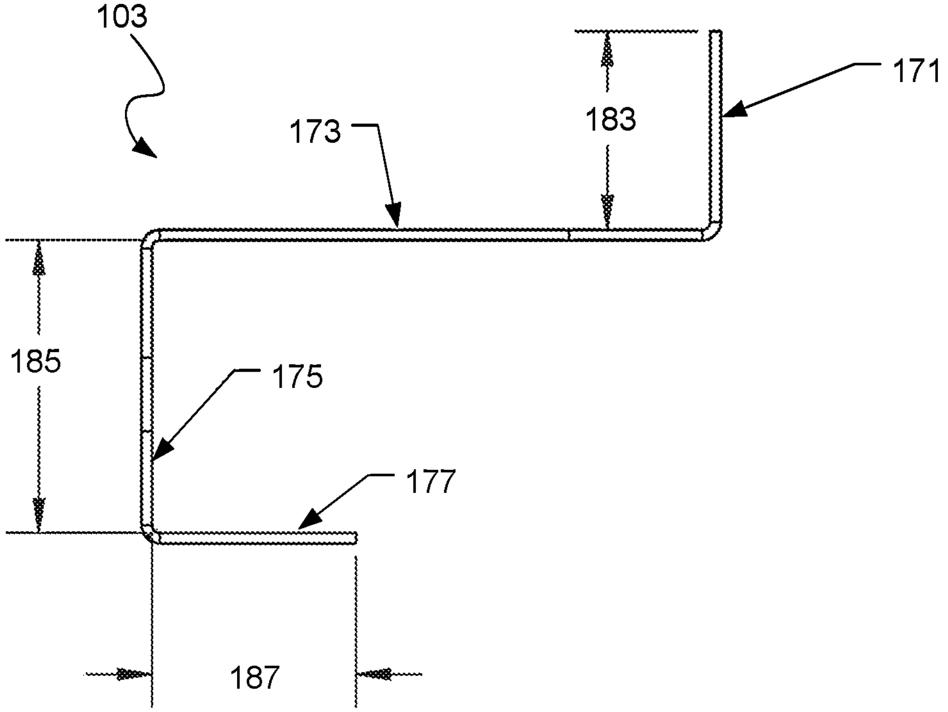
FIG. 9 is a side view of the tuning element of FIG. 2.
Figure 10:
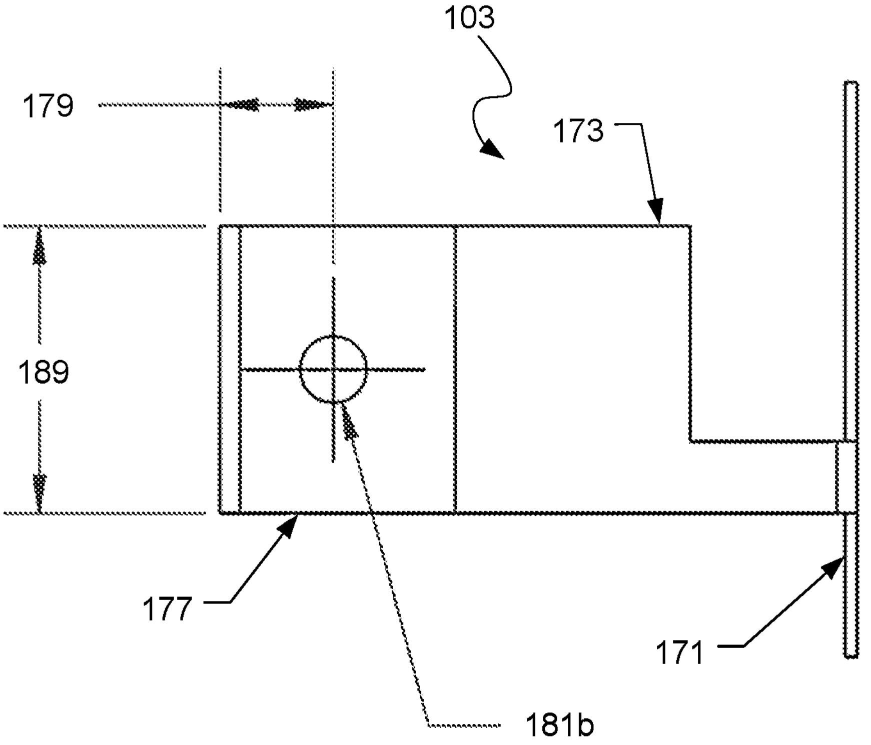
FIG. 10 is a bottom view of the tuning element of FIG. 2.
Figure 11:
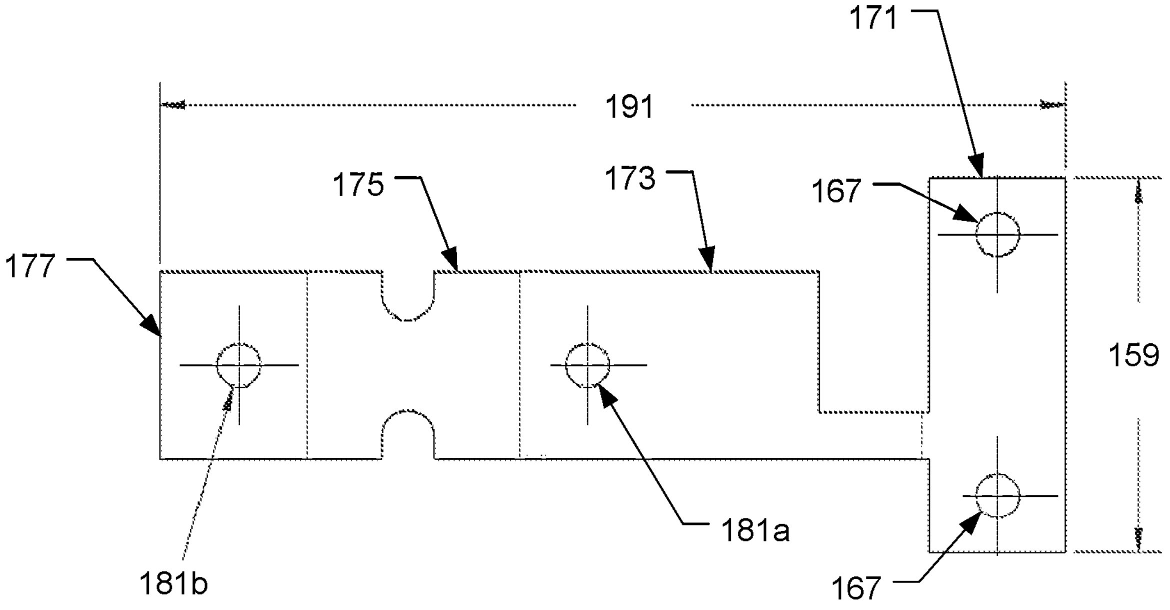
FIG. 11 is a flat pattern view of the tuning element of FIG. 2.

Referring now to FIG. 2, a perspective view of tuner 103 is illustrated in accordance with an embodiment of the present invention.

In general, tuner 103 is a tuning element for antenna 101. Tuner 103 comprise of face plate 171, arm 173, body 175, and base 177. The components of tuner 103 are further predicted and illustrated with reference to FIGS. 7-11.

Referring now to FIGS. 3-6, a variety of views of antenna 101 as well as a cutout of antenna 101 is illustrated according to an embodiment of the present invention. Dimensions for an exemplary embodiment of antenna 101 are included in Table 1.

Components of antenna 101 are symmetrical with respect to symmetry line 102.

TABLE 1

| Label Number | Distance (Inches) |
|---|---|
| 105 | 0.615-0.635 |
| 107 | 0.440-0.460 |
| 109 | 0.115-0.135 |
| 111 | 0.097-0.117 |
| 113 | 0.190-0.210 |
| 115 | 0.238-0.258 |
| 117a | 0.119-0.139 (Diameter) |
| 117b | 0.119-0.139 (Diameter) |
| 119 | 0.042-0.062 (Diameter) |
| 121 | 0.821-0.841 |
| 123 | 1.705-1.725 |
| 131 | 0.181-0.201 |
| 133 | 0.340-0.360 |
| 135 | 0.508-0.528 |
| 137 | 0.750-0.770 |
| 139 | 0.902-0.922 |
| 141 | 1.156-1.176 |
| 145 | 0.333-0353 |
| 147 | 0.809-0.829 |
| 149 | 1.640-1.660 |
| 151 | 2.205-2.225 |
| 153 | 3.324-3.344 |
| 155 | 5.990-6.010 |
| 157a | 0.119-0.139 (Diameter) |
| 157b | 0.119-0.139 (Diameter) |
| 157c | 0.119-0.139 (Diameter) |

Furthermore, antenna 101 has a plurality of apertures, namely apertures 117*ab*, aperture 119, and apertures 157*a-c*. In one embodiment, aperture 119 is a connection aperture for connecting antenna 101 to a radio transceiver and/or receiver. In some embodiments, antenna 101 is soldered to an antenna connection of a radio transceiver and/or receiver via aperture 119. Exemplary locations and diameter distances of apertures 117*a-b*, aperture 119, and apertures 157*a-c* are provided in Table 1.

In one embodiment, antenna 101 is manufactured as cut-out from a sheet of metal (illustrated in FIG. 6) having a thickness of 0.02 inches and has associated members bent to a corresponding angle. In alternate embodiments, the thickness of antenna 101 can range from 0.01 to 0.03 inches. In one embodiment, antenna 101 is formed such that each arm of arms 127 are folded towards a front face (i.e., face 130) of body 125 by angle 143. In an exemplary embodiment, angle 143 is at or within 79-81 degrees. In one embodiment, head 129 is folded towards the front face of body 125 at an angle at or within 89-91 degrees. In an exemplary embodiment, arms 127 and head 129 have a fold radius at or within 0.005-0.025 inches respective to body 125.

Referring now to FIGS. 7-11, a variety of views of tuner 103 as well as a cut-out of tuner 103 is illustrated according to an embodiment of the present invention.

Dimensions for an exemplary embodiment of tuner 103 are included in Table 2.

TABLE 2

| Label Number | Distance (Inches) |
|---|---|
| 159 | 0.995-1.005 |
| 161 | 0.695-0.705 |
| 163 | 0.377-0.387 |
| 165 | 0.176-0.186 |
| 167 | 0.111-0.121 (Diameter) |
| 169 | 0.290-0.300 |
| 170 | 0.136-0.146 |
| 179 | 0.192-0.202 |
| 181a | 0.111-0.121 (Diameter) |
| 181b | 0.111-0.121 (Diameter) |
| 183 | 0.375-0.385 |
| 185 | 0.555-0.565 |
| 187 | 0.385-0.395 |
| 189 | 0.495-0.505 |
| 191 | 2.421-2.431 |

Furthermore, tuner 103 has a plurality of apertures, namely apertures 167 and apertures 181*a-b*. In some embodiments, aperture 181*a* and 181*b* are concentrically aligned. Exemplary locations and diameter distances of apertures 167 and apertures 181*a-b* are provided in Table 2.

In one embodiment, tuner 103 is manufactured as a cut-out from a sheet of metal (illustrated in FIG. 11) having a thickness of or within 0.017-0.023 inches. In one embodiment, tuner 103 is formed such that arm 173 and base 177 are folded towards a front face (i.e., face 178) of body 175 at an angle at or within 89-91 degrees. Furthermore, face plate 171 is folded away from the front face of body 175 at an angle at or within 8991 degrees such that face plate 171 is planarly parallel to body 175. In an exemplary embodiment, arm 173 and base 177 have a fold radius at or within 0.01-0.03 inches respective to body 175. Furthermore, face plate 171 has a fold radius at or within 0.01-0.03 inches respective to arm 173.

Referring now to FIG. 12, an exploded perspective view of antenna assembly 200 employing antenna 101 and tuner 103 is illustrated in accordance with an embodiment of the present invention.

In this figure, antenna 101 is paired with tuner 103 to form an antenna group. The antenna group is configured such that tuner 103 is a predetermined distance from the front of antenna 101 (i.e., tuner 103 is positioned between arms 127) and wherein face plate 171 is oriented to face towards the front face of body 125 of antenna 101. In some embodiments, face plate 171 is planarly parallel to body 125. In this figure, two antenna groups are oppositely positioned from each other. In other words, a first antenna group having a first antenna and a first tuner face a second antenna group having a second antenna and a second tuner such that the front of the first antenna faces the front of the second antenna. Furthermore, tuner 103 is connected to a tuner connection of a radio transceiver and/or receiver, and antenna 101 is connected to an antenna connection of a radio transceiver and/or receiver.

In this figure, antenna assembly 200 comprise of a variety of components: radome 201 is a top mounted cover for antenna assembly 200; PCB 203 is a printed circuit board; stand 205 is a structural stand for securing antenna 103 to base 223 via apertures 117*a* using screw fasteners and corresponding nuts (i.e., screws 237 and nuts 235); coax 207 is a flexible low loss coax cable; holder 209 is a structural stand for PCB 203; washer 211 is a spring washer; nut 213 is a threaded nut; washer 215 is a flat washer; screws 217 are screws for securing radome 201 to base 223; gasket 219 is a gasket that is mounted between assembly 200 and a mounting surface (not shown); tape 221 is a high bonding tape for securing GPS antenna 227 to base 223; base 223 is a die cast base member; gasket 225 is a gasket for forming a weather resistant seal between radome 201 and base 223; GPS antenna 227 is a global positioning system antenna; screws 229 are screw fasteners for securing stand 205 to base 223; plate 231 is a plate; screws 233 are screws for securing plate 231 to base 223; and nuts 235 are nuts corresponding to screws 237.

In further embodiments, the antenna assembly comprises a plurality of antenna group pairs. For example, an antenna assembly comprise a first and a second antenna (and corresponding tuners) that face each other to form a first antenna group, and a third and fourth antenna (and corresponding tuners) face each other to form a second antenna group, wherein the second antenna group is positioned a proximate distance away from the first antenna group.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A multi-band antenna system, comprising:

a first antenna group, comprising:

a first antenna having a first body portion with a first front face, a first head portion, a first left arm, and a first right arm;

a second antenna having a second body portion with a second front face, a second head portion, a second left arm, and a second right arm; and a first group ground reference base; and a second antenna group spaced a proximate distance from the first antenna group, the second antenna group comprising:

a third antenna having a third body portion with a third front face, a third head portion, a third left arm, and a third right arm;

a fourth antenna having a fourth body portion with a fourth front face, a fourth head portion, a fourth left arm, and a fourth right arm; and a second group ground reference base; and wherein the first front face of the first antenna oppositely faces the second front face of the second antenna during use as respective first resonating components of the first antenna group;

wherein the first and second head portions angularly extend generally toward each other from the respective first and second body portions during use of the first and second head portions as respective second resonating components of the first antenna group;

wherein the first and second left arms angularly extend generally toward each other from the respective first and second body portions during use of the first and second left arms as respective third resonating components of the first antenna group;

wherein the first and second right arms angularly extend generally toward each other from the respective first and second body portions during use of the first and second right arms as respective fourth resonating components of the first antenna group;

wherein at least one of the respective first, second, third, and fourth resonating components of the first antenna group is configured to resonate within a low frequency band of between 600 MHz and 700 MHz during use; and wherein at least one of the respective first, second, third, and fourth resonating components of the first antenna group is configured to resonate within a high frequency band of between 2.7 GHz and 6.0 GHz during use;

wherein the third front face of the third antenna oppositely faces the fourth front face of the fourth antenna during use as respective fifth resonating components of the second antenna group;

wherein the third and fourth head portions angularly extend generally toward each other from the respective third and fourth body portions during use of the third and fourth head portions as respective sixth resonating components of the second antenna group;

wherein the third and fourth left arms angularly extend generally toward each other from the respective third and fourth body portions during use of the third and fourth left arms as respective seventh resonating components of the second antenna group;

wherein the third and fourth right arms angularly extend generally toward each other from the respective third and fourth body portions during use of the third and fourth right arms as respective eighth resonating components of the second antenna group;

wherein at least one of the respective fifth, sixth, seventh, and eighth resonating components of the second antenna group is configured to resonate within a low frequency band of between 600 MHz and 700 MHz during use; and wherein at least one of the respective fifth, sixth, seventh, and eighth resonating components of the second antenna group is configured to resonate within a high frequency band of between 2.7 GHz and 6.0 GHz during use.

2. The multi-band antenna system of claim 1, wherein at least one of the first antenna group and the second antenna group further comprises a first GPS antenna.

3. The multi-band antenna system of claim 1, wherein the first antenna group further comprises a first GPS antenna and the second antenna group further comprises a second GPS antenna.

4. The multi-band antenna system of claim 1, wherein at least one of the first antenna group and the second antenna group further comprises a first PCB.

5. The multi-band antenna system of claim 1, wherein at least one of the first antenna group and the second antenna group further comprises a plurality of PCBs.

6. The multi-band antenna system of claim 1, wherein each of the first antenna group and the second antenna group further comprises a plurality of PCBs.

7. The multi-band antenna system of claim 1, wherein at least one of the respective first and second resonating components of the first antenna group is configured to resonate within a low frequency band of between 600 MHz and 700 MHz during use.

8. The multi-band antenna system of claim 1, wherein each of the respective first and second resonating components of the first antenna group is configured to resonate within a low frequency band of between 600 MHz and 700 MHz during use.

9. The multi-band antenna system of claim 1, wherein at least one of the respective third and fourth resonating components of the first antenna group is configured to resonate within a high frequency band of between 2.7 GHz and 6.0 GHz during use.

10. The multi-band antenna system of claim 1, wherein each of the respective third and fourth resonating components of the first antenna group is configured to resonate within a high frequency band of between 2.7 GHz and 6.0 GHz during use.

11. The multi-band antenna system of claim 1, wherein at least one of the respective fifth and sixth resonating components of the second antenna group is configured to resonate within a low frequency band of between 600 MHz and 700 MHz during use.

12. The multi-band antenna system of claim 1, wherein each of the respective fifth and sixth resonating components of the second antenna group is configured to resonate within a low frequency band of between 600 MHz and 700 MHz during use.

13. The multi-band antenna system of claim 1, wherein at least one of the respective seventh and eighth resonating components of the second antenna group is configured to resonate within a high frequency band of between 2.7 GHz and 6.0 GHz during use.

14. The multi-band antenna system of claim 1, wherein each of the respective seventh and eighth resonating components of the second antenna group is configured to resonate within a high frequency band of between 2.7 GHz and 6.0 GHz during use.

* * * * *